O. KLUGE.
MOWING ATTACHMENT FOR MOTOR VEHICLES.
APPLICATION FILED APR. 8, 1912.
1,092,722.
Patented Apr. 7, 1914.
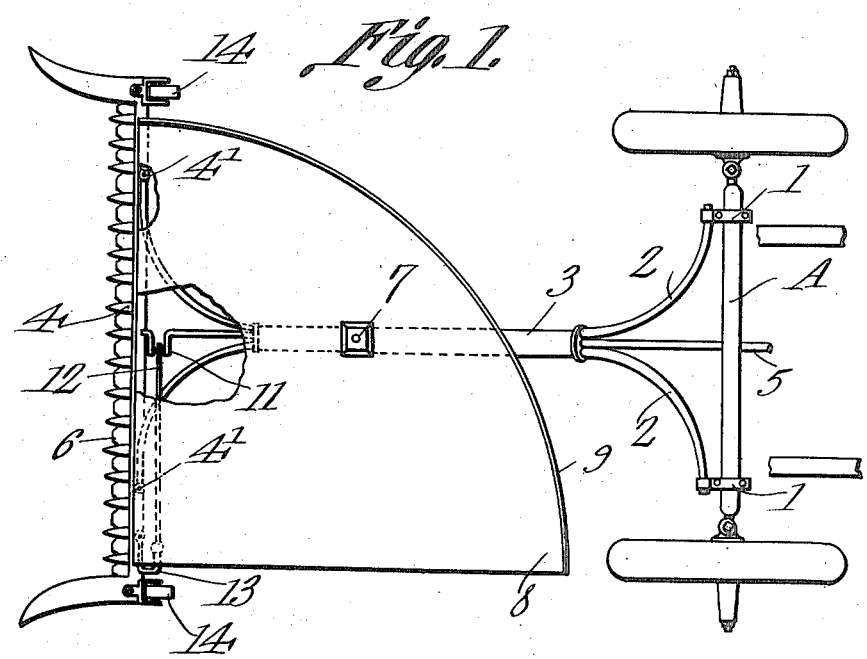
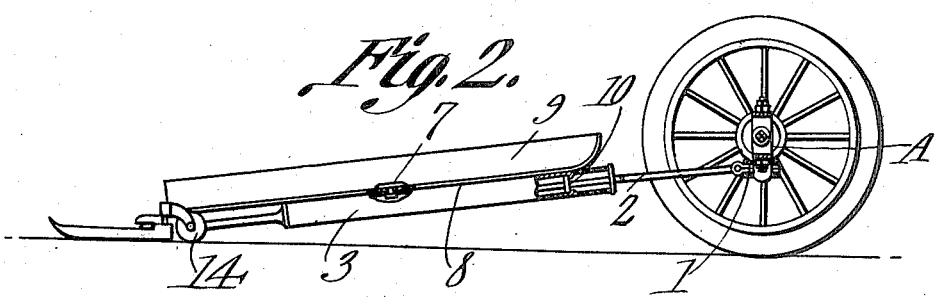
Witnesses
Otto Kluge,
Inventor
by
Attorneys

UNITED STATES PATENT OFFICE.

OTTO KLUGE, OF GOLCONDA, ILLINOIS.

MOWING ATTACHMENT FOR MOTOR-VEHICLES.

1,092,722.     Specification of Letters Patent.     Patented Apr. 7, 1914.

Original application filed January 15, 1912, Serial No. 671,185. Divided and this application filed April 8, 1912. Serial No. 689,392.

*To all whom it may concern:*

Be it known that I, OTTO KLUGE, a citizen of the United States, residing at Golconda, in the county of Pope and State of Illinois, have invented a new and useful Mowing Attachment for Motor-Vehicles, of which the following is a specification.

This invention relates to mowing attachments for motor vehicles and one of its objects is to provide means for transmitting motion to the cutter bar.

Another object is to pivotally connect the cutter bar to the connecting frame to permit the bar to follow irregularities of the surface of the ground.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a plan view of the attachment, a portion of the motor vehicle to which it is secured being also shown. Fig. 2 is a side elevation of the attachment, a portion of the motor vehicle being shown in section.

Referring to the figures by characters of reference A designates the front axle of a motor vehicle and this axle is adapted to be detachably engaged by clamps 1 to which are connected arms 2 swiveled at 10 to the frame 3 of the attachment. A finger bar 4 is pivotally connected as at 4' to the front end of the frame 3 and a shaft 5 is carried by the frame and is provided with mechanism such as hereinafter described for reciprocating the cutter bar 6, said shaft 5 being adapted to receive motion, through any suitable mechanism provided therefor, from the motor of the vehicle to which the attachment is secured.

A pivot stud 7 extends upwardly from the frame 3 and is engaged by a segmental platform 8 the curved or arcuate edge of which is preferably upturned, as shown at 9 so as to constitute a deflector. This platform is adapted to be reversed so as to throw cut material toward either side desired. Said reversible platform, however, constitutes no part of the present invention but is covered in an application filed in the United States Patent Office by me on January 15, 1912, Serial No. 671,185, and of which the present case is a division.

The lower or front section of the shaft 5 has a crank 11 engaged by a pitman 12, which in turn, is connected to a stem 13 secured to the cutter bar 6 near one end. Obviously, therefore, when shaft 5 is rotated reciprocatory motion will be imparted to the bar 6.

Ground wheels 14 are connected to the ends of the finger bar 4 to permit the structure to turn readily. As the finger bar is pivotally connected to the frame 2 it can ride easily over uneven ground. By reason of the swivel connection between arms 2 and frame 3, said frame and the finger bar are free to tilt about the shaft 5 as an axis and thus follow the slant of the surface on which the bar is mounted.

What is claimed is:—

A mowing attachment for automobiles, including rearwardly diverging arms, clamps adapted to engage the front axle of an automobile and pivotally engaged by the respective arms, said arms being adapted to swing upwardly and downwardly relative to the clamps, a frame including forwardly diverging arms, said frame being mounted to rotate relative to the rearwardly diverging arms, said rearwardly diverging arms being swiveled in the frame, a finger bar extending transversely of the front end of the frame and pivotally connected to the forwardly diverging arms, a cutter bar mounted to reciprocate on the finger bar, a shaft extending longitudinally within the frame and between the forwardly and rearwardly diverging arms, said shaft having a crank, and a pitman connection between the crank and cutter bar.

In testimony that I claim the foregoing as my own, I have hereto affixed my signature in the presence of two witnesses.

OTTO KLUGE.

Witnesses:
W. A. WHITESIDE,
DAISY V. McCOY.